N. HUBLINGER.
OUTLET BRACKET FOR ELECTRIC FIXTURES.
APPLICATION FILED FEB. 26, 1909.
950,176.
Patented Feb. 22, 1910.
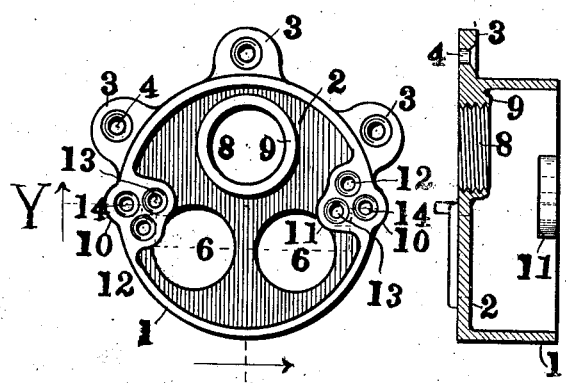
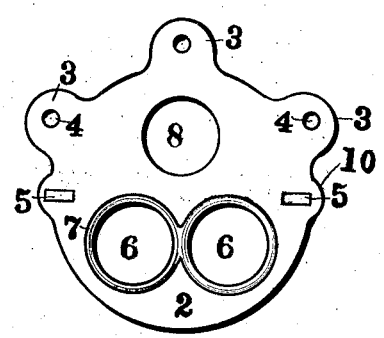
FIG. 1  FIG. 2  FIG. 3
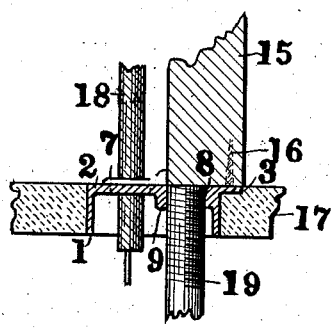
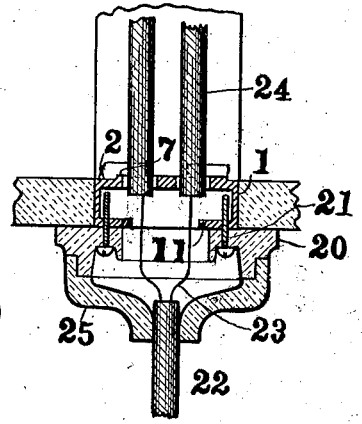
FIG. 4  FIG. 5
WITNESSES
Glenara Fox
Grace B Humphrey
INVENTOR
Newton Hublinger
by C. E. Humphrey,
ATTORNEY.

UNITED STATES PATENT OFFICE.

NEWTON HUBLINGER, OF AKRON, OHIO.

OUTLET-BRACKET FOR ELECTRIC FIXTURES.

950,176.  Specification of Letters Patent.  Patented Feb. 22, 1910.

Application filed February 26, 1909. Serial No. 480,220.

*To all whom it may concern:*

Be it known that I, NEWTON HUBLINGER, a citizen of the United States, residing at Akron, in the county of Summit and State of Ohio, have invented new and useful Improvements in Outlet-Brackets for Electric Fixtures, of which the following is a specification.

This invention relates to outlet brackets for supporting electric light fixtures of the general type shown in U. S. Letters Patent granted to me February 9, 1909, No. 911,989.

The primary object of this invention is to provide a device of the general character mentioned embodying a cup-shaped body adapted to be embedded in the cementitious material of a wall or ceiling of a building to constitute an outlet for the ends of electric wires, the major portions of which are embedded in the wall and which are brought to said bracket by any of the ordinary means for insulating wires of this character, said device being provided with openings to receive the ends of the wires and devices for fixedly supporting various types of electrical fixtures in alternation thereon, thereby adapting the same to support any of the ordinary types of electrical fixtures and which will permit the substitution of one fixture for another without changing the bracket itself.

The device is preferably constructed with a marginal flange forming a portion of the body of the device and when positioned the outer edge or face of this flange will be approximately flush with the face of the wall or ceiling, said flange serving to protect the plaster from injury during the manipulation of the wires in adapting or extending them to the openings provided in the various fixtures used in connection with this device. It will be seen therefore, that by positioning a device of this character in a wall or ceiling, ample space is provided for the necessary bending or manipulation of the wires in adjusting them to the different types of fixtures supported thereby. Experience has demonstrated that the openings for the wires in different types of fixtures and the fixtures of different makes of the same type vary materially with respect to the position of the openings through which the wires are conducted to the binding screws or terminals of the fixtures.

A still further object is to so construct the device that when, for instance, the device is being used to support an electrolier or chandelier and it is desired to substitute for the chandelier a different fixture, the chandelier can be removed and a snap switch, rosette, wall bracket or other fixtures attached to said device.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

In the drawings, in which similar reference numerals indicate like parts in the different figures: Figure 1 is a plan view of a device embodying this invention. Fig. 2 is a sectional view on line X of Fig. 1. Fig. 3 is an inverted or reverse plan of the device shown in Fig. 1. Fig. 4 is a sectional view of the device shown in Figs. 1, 2 and 3 in operative relation with the supporting member of an electrolier or chandelier; and, Fig. 5 is a sectional view on line Y of Fig. 1 of the same device shown in connection with a rosette for a drop cord.

Referring to the drawings in detail, the device comprises a body portion provided with a marginal flange 1 extending from and integral with a base or rear wall 2, said wall forming the bottom of a cup-shaped device. Extending laterally from the marginal flange 1 are a plurality of ears 3 provided with openings 4 to receive holdfast devices for fixedly securing the device to a supporting instrumentality. The rear face of the wall 2 is provided with one or more transversely-extending lugs 5 constituting guiding means to be used in positioning the device. The wall 2 is provided with one or more openings 6 having formed around them rounded beadings 7 for the purpose of protecting the insulation on the wires from abrasion or injury. The wall 2 is further provided with an opening 8 surrounded by a flange 9 projecting into the interior of the cup-shaped portion of the device. The opening 8 and flange 9 are preferably threaded for the purpose of receiving the threaded upper member of an electrolier or chandelier.

The marginal flange 1, at preferably oppositely-disposed points, is outwardly-bent or extended at 10, and integral therewith at suitable points are inwardly-extending flanges 11 each provided with a plurality of threaded openings 12, 13 and 14 adapted to receive threaded holdfast devices used in securing various types of electrical fixtures to the face of the marginal flange 1. The outwardly-bent portions 10 of the marginal flange provide added space to receive the ends of any holdfast devices which may be passed through the openings 14; in other words, the marginal flange 1 is outwardly-bent or extended at the point 10 so that holdfast devices passed through the openings 14 will not encounter or be obstructed by the flange itself.

In Fig. 4 the device is illustrated as secured to a joist 15 by a holdfast device 16 passed through the aperture 4 in one of the lugs 5 and as shown the device is positioned with the rear face of the wall 2 against the face of the joist with the lugs 5 disposed against one of the sides of the joist to constitute guiding members for assistance to a workman in placing the device in position. The cementitious material 17 of which the ceiling or wall is composed is shown surrounding the device and of approximately the same thickness as the width thereof, so that the outer face of the marginal flange 1 will be substantially flush with the outer face of the wall or ceiling. The wires 18 for conducting the electric current to the fixtures and properly insulated are shown extended through the openings 6 into the interior of the device, wherein they may be bent into any position to permit them to connect with the terminals or binding posts of the fixtures used on the device. The necessary bending of the current-conducting wires within the interior of the device places them in proper position to be extended to the fixtures and the scraping or removal of the insulation therefrom can readily be done without injury to the cementitious material of which the wall or ceiling is composed. The upper threaded member 19 of the electrolier or chandelier is then screwed into the opening 8 and the chandelier supported thereby. If for any reason the surface of the joist is uneven or out of proper alinement a thin spacing washer or sheet of cardboard may be placed between the rear face of the device and the lower edge of the joist to tilt the chandelier in a desired direction sufficiently to cause it to hang plumb. It will of course be obvious in positioning the device that a short piece of gas-pipe may be screwed into the opening 8 and the outlet bracket temporarily held thereby and accurately positioned before the upper end of the chandelier is finally inserted therein, but this latter operation is simply for the convenience of the workman, as the chandelier may be placed in the threaded opening 8 in the first instance if so desired.

In Fig. 5 the same device is shown with a rosette secured thereto sustaining a drop cord. A rosette customarily consists of a base portion 20 provided with suitable apertures to receive holdfast devices 21 which extend therethrough into one of the pairs of openings 12, 13 or 14 in each of the flanges 11. The drop cord 22 is then placed in the cap of the rosette and the conducting wires 23 leading from the main conducting wires 24 connected with the wires contained in the drop cord 22. The cap 25 of the rosette is then secured on the base and the device is ready for use. It will be seen from this latter application of the use of the device that the wires shown within the marginal flange 1 may be moved or bent as desired to adapt them to any of the openings in any type of fixture which is employed or being mounted on this form of device. It will be further seen that by providing a plurality of openings in each of the flanges 11 the device may be made to accommodate substantially any type of electric fixture for the reason that if the openings in the fixture to be used will not register with one pair of openings, they will under ordinary circumstances, register with another pair, thus adapting the device to receive fixtures having differently-spaced openings for holdfast devices. It will be further stated that all insulated wires carried through cementitious material of a wall or ceiling without the use of this device, necessarily require considerable bending to adapt them to different types of fixtures, which operation is liable to injure the ceiling or wall and in such a case where the wires are bent in order to adapt them to the openings in the fixtures, they will of necessity rest on the outer face of the wall or ceiling unless it is dug or cut away to receive them, thereby furnishing an insecure seat for the device and rendering its proper positioning a very unsatisfactory matter.

What I claim and desire to secure by Letters Patent, is:—

An outlet bracket adapted to support in alternation various forms of electrical devices comprising a cup-shaped body portion provided with a base the rear face of which is approximately flat, said base further provided with an annular forwardly-extending marginal flange, said cup-shaped body portion adapted to be submerged in the cementitious material of a wall or ceiling with the front edge of said flange approximately flush with the surface of said wall or ceiling, said base provided with an opening inclosed by an annular flange extending into the space surrounded by said marginal flange, the opening in said base and the inner wall of said inner flange threaded to constitute means for engaging the threaded upper end of an electrolier or chandelier, said base further provided with an opening to permit the passage therethrough of an insulated current conducting wire, said body portion further provided with a plurality of laterally-extending ears having apertures to receive holdfast devices for securing the bracket to a sustaining member, said marginal flange provided with inwardly-extending members the front faces of which are flush with the front face of said marginal flange and parallel with the base of said bracket, each of said members provided with a plurality of threaded openings arranged to receive holdfast devices for supporting electrical fixtures when an electrolier or chandelier is not secured in said first mentioned threaded opening and a lug extending rearwardly from the rear face of said base constituting a guiding element to be used in positioning a bracket.

In testimony whereof I have hereunto set my hand in presence of two subscribing witnesses.

NEWTON HUBLINGER.

Witnesses:
GLENARA FOX,
C. E. HUMPHREY.